United States Patent [19]

Devona et al.

[11] Patent Number: 4,500,673

[45] Date of Patent: Feb. 19, 1985

[54] VINYLIDENE CHLORIDE AND STYRENE-CONTAINING COPOLYMER LATICES

[75] Inventors: James E. Devona, Mount Prospect; Martin L. Essigmann, Palatine, both of Ill.

[73] Assignee: DeSoto, Inc., Des Plaines, Ill.

[21] Appl. No.: 553,566

[22] Filed: Nov. 21, 1983

[51] Int. Cl.$^3$ ............................................. C08L 39/00
[52] U.S. Cl. .................................. 524/548; 524/825; 524/562; 526/329.2; 526/331
[58] Field of Search ..................... 524/825, 562, 548; 526/329.2, 331

[56] References Cited

U.S. PATENT DOCUMENTS

| | | | |
|---|---|---|---|
| 2,605,257 | 7/1952 | Wolf et al. ........................ | 526/329.2 |
| 3,696,082 | 10/1972 | Smith ................................. | 524/825 |
| 4,371,659 | 2/1983 | Druschke et al. ................ | 526/329.2 |
| 4,426,503 | 1/1984 | Sandri et al. ...................... | 524/548 |

Primary Examiner—Paul R. Michl
Assistant Examiner—Alex H. Walker
Attorney, Agent, or Firm—Dressler, Goldsmith, Shore, Sutker & Milnamow, Ltd.

[57] ABSTRACT

An aqueous latex is disclosed which possesses improved water resistance at reduced acrylic ester content for use in exterior latex paints. This latex comprises an aqueous emulsion copolymer of monomers consisting essentially of from 10% to 30% of vinylidene chloride together with 20% to about 50% of styrene, and from 40% to 60% of monoethylenic ester, preferably acrylic or methacrylic esters, the mixture of monomers providing the copolymer with a glass transition temperature in the range of $-10°$ C. to $+10°$ C., and from 0% to 10.0% of a monomer promoting adhesion, the proportions being based on the total weight of monomers copolymerized.

8 Claims, No Drawings

VINYLIDENE CHLORIDE AND STYRENE-CONTAINING COPOLYMER LATICES

DESCRIPTION

1. Field of Invention

This invention relates to aqueous emulsion copolymers and latex paints containing them having improved resistance to water vapor transmission, especially in combination with improved adhesion.

2. Background Art

Aqueous emulsion copolymers are commonly used in latex paints for painting homes, both exterior and interior. These paints are frequently based on aqueous emulsion copolymers which include a large proportion of relatively expensive acrylic monomers. It would be desirable to replace all or part of these monomers with lower cost materials, such as styrene. Unfortunately, when more than about 15% of styrene is incorporated into such polymers, wet adhesion of the resulting paints begins to suffer. This difficulty becomes more pronounced as the proportion of acrylic monomer is decreased, and as paints containing the emulsion copolymers are subjected to more rigorous use, as in exterior paints. Industry has long sought a practical way to avoid this difficulty so that latex paints containing reduced amounts of expensive acrylate monomers might be more satisfactorily used.

DISCLOSURE OF INVENTION

In accordance with this invention, an aqueous latex comprises an aqueous emulsion copolymer of a mixture of monomers consisting essentially of from 10% to 30% of vinylidene chloride together with a mixture of 20% to about 50% of styrene, and from 40% to 60% of one or more monoethylenic esters which provide the copolymer with a glass transition temperature in the range of −10° C. to +10° C., preferably −5° C. to +5° C. The monoethylenic esters are illustrated by acrylic or methacrylic esters, preferably with alkanols containing from 2 to 8 carbon atoms, such as n-butyl acrylate, isobutyl methacrylate, and the like. The copolymer also includes from about 0% to 10.0%, preferably from 0.5% to 5%, of a monomer promoting adhesion, preferably a ureido-functional monomer. The resulting aqueous latex can be formulated into latex paints which exhibit improved water resistance compared to a copolymer having the same glass transition temperature, but which does not contain vinylidene chloride. At the same time, yellowing introduced by the vinylidene chloride component is minimized due to the presence of a significant proportion of the acrylic monomers. When the specified amounts of the ureido monomer are incorporated into the copolymer in the preferred practice of this invention, the resulting latex and paints containing the same exhibit good adhesion to the surface being painted. The result is a paint which is fully as satisfactory as the all acrylic latex paints which are now in use.

It should be appreciated that vinylidene chloride is an inexpensive monomer, and so is styrene, so the inclusion of a significant proportion of these monomers in place of acrylic or similar ester monomers provides a considerable economy. Also, even though vinylidene chloride has a boiling point below the desired polymerization temperature, this monomer can be introduced into the aqueous emulsion polymerization reactor in the proportions used herein, at or near the bottom of the reactor without the need to close the reactor. This allows atmospheric pressure operation which provides a desirable economy. Still further, and in the proportions found to be effective herein, yellowing introduced by the vinylidene chloride component is minimized, as noted previously, and this minimal yellow coloration is easily masked by normal pigmentation of the paint.

The glass transition temperatures referred to are determined by measurement (differential thermal analysis). This is more accurate than theoretical calculation for vinylidene chloride-containing copolymers.

It will be appreciated that the aqueous emulsion copolymerization is itself well known and is illustrated in the examples. Appropriate concentrations, surfactants, catalysts and operating procedures are mostly conventional. It is a feature of this invention that one can economically produce the latices under consideration at atmospheric pressure using conventional polymerization temperatures. Polymerization is conveniently carried out at temperatures in the range of 20° C. to 80° C., about 60° C. being preferred herein, and it is preferred to proceed at an acid pH of from 2.0–5.0. Another feature of this invention is that the vinylidene chloride addition to the polymerization is delayed until after polymerization has been established by the presence of the other monomers.

The final glass transition temperature is a function of all the monomers which are employed and their proportion of use. Once the proportions of vinylidene chloride and styrene have been selected, the desired glass transition temperature determines how the balance of the monomers can be selected.

The third essential monomer is a monoethylenic ester, most preferably an acrylic or methacrylic ester with an alkanol having from 2–8 carbon atoms, most preferably a butyl acrylate such as n-butyl acrylate. Ethyl acrylate, isobutyl acrylate, 2-ethyl hexyl acrylate and the corresponding methacrylates will further illustrate the monoethylenic esters which lower the excessively high $T_g$ provided by the vinylidene chloride and styrene. The selection and proportion of the ester monomers function to lower the glass transition temperature into the defined range, so this determines how much of which monomer can be present.

The aqueous emulsion copolymers are compounded into latex paints in conventional fashion, these being normally neutralized to a pH of 6.5–8.0 when this is carried out.

Many patents describe the adhesion-promoting monomers desirably used herein and which contain a ureido hydrogen atom. These monomers are preferably derived from ethylene urea which is linked to a copolymerizable ethylenic group. Monoethylenic monomers are preferred, but this is not essential since polyethylenic derivatives are also effective to promote adhesion and do not cause difficulty in the small amounts needed to enhance adhesion.

It is particularly preferred to include a ureido-functional adhesion promoting monomer which is a derivative of ethylene urea, such as the reaction product of 2-hydroxyethyl ethylene urea with one molar proportion of maleic anhydride and then with one molar proportion of 1,2-propylene oxide, or the reaction product of 2-hydroxyethyl ethylene urea with one molar proportion of 1,2-propylene oxide and then with one molar proportion of allyl glycidyl ether, or the reaction product of 2-aminoethyl ethylene urea with one to two molar proportions of allyl glycidyl ether, or the reaction product of 2-aminoethyl ethylene urea with one molar proportion of an epoxy ester, such as the glycidyl ester of neodecanoic acid, and then with one molar proportion of allyl glycidyl ether. These ureido-functional adhesion-promoting monomers are the subject of many U.S. Patents, reference being made to U.S. Pat. Nos. 3,356,653, 3,509,085 4,151,142, and 4,319,032.

Throughout this application, and in the examples and claims which follow, all proportions are by weight, unless otherwise specified.

EXAMPLE 1

A monomer pre-emulsion having the following composition is prepared:

| Parts (wet) | component |
|---|---|
| 719.0 | Deionized water |
| 71.4 | Sodium salt of a sulfonated octyl phenol polyethoxylate containing 2 molar proportions of adducted ethylene oxide (28% solids in water) [Triton X-200 from Rohm & Haas may be used] |
| 20.0 | Nonyl phenol adducted with 9.5 molar proportions of ethylene oxide (Triton N-101 supplied by Rohm & Haas may be used) |
| 50.0 | Adhesion promoting monomer (reaction product of 2-hydroxyethyl ethylene urea with one molar proportion of maleic anhydride and then with one molar proportion of 1,2-propylene oxide)[80% in water] |
| 860.0 | Styrene |
| 890.0 | n-Butyl acrylate |
| 10.0 | Acrylic acid |
| 14.3 | t-Butyl hydroperoxide (70% active) |

A reductant solution is made by dispersing 6.0 parts of sodium formaldehyde sulfoxylate in 69.0 parts of deionized water.

A five liter four-neck flask, equipped with a paddle stirrer, a water-cooled condenser in tandem with an ice-filled cold finger condenser, a nitrogen inlet, and three stainless steel addition tubes which extend to the bottom of the reactor, is suspended in a water bath capable of being heated to about 60° C.

The flask is pre-charged with a solution of 1.0 part of an iron-ethylene diamine tetraacetic acid complex (1% water solution) in 818 parts of deionized water. The water bath is heated in 60° C., and a 1 part of the reductant solution is added to the flask. Immediately, the pre-emulsion and the remaining reductant solution are slowly added to the flask at a rate that requires 4 hours for the total addition. The temperature in the flask increases over the first 30 minutes, and the vinylidene chloride (inhibited with 200 ppm of methyl hydroquinone) addition is then started at a rate to require three hours for this addition.

After the vinylidene chloride addition is complete, the reaction temperature is allowed to fall below the temperature of the water bath and the following solutions are added three minutes apart:
a. 1.25 parts t-butyl hydroperoxide (70% active)
b. 6.00 parts sodium formaldehyde sulfoxylate solution (8% active)

The above post additions are repeated at 15 minute intervals until the conversion, measured by evaluation of non-volatile content, is constant.

The final latex has a non-volatile content of 54.97%, a particle size of 0.23 micron measured by specific turbidity, a pH of 2.5, a weight per gallon of 8.82 pounds, and a vinylidene chloride content of 10% based on total polymer.

The water vapor transmission rate of a film of this latex, plasticized with 2% of 2,2,4-trimethylpentanediol-1,3-monoisobutyrate on a total weight basis, was 13.8 gram.mil/m$^2$ day.mm Hg as compared with 63.4 gram.mil/m$^2$ day.mm Hg for a commercial latex containing only acrylic monomers.

EXAMPLE 2

A monomer pre-emulsion of the following composition was prepared:

| Parts (wet) | component |
|---|---|
| 808.0 | Deionized water |
| 71.4 | Sodium salt of a sulfonated octyl phenol polyethoxylate containing 2 molar proportions of adducted ethylene oxide (28% solids in water) [Triton X-200 from Rohm & Haas may be used] |
| 20.0 | Nonyl phenol adducted with 9.5 molar proportions of ethylene oxide (Triton N-101 supplied by Rohm & Haas may be used) |
| 50.0 | Adhesion promoting monomer (reaction product of 2-hydroxyethyl ethylene urea with one molar proportion of maleic anhydride and then with one molar proportion of 1,2-propylene oxide)[80% in water] |
| 600.0 | Styrene |
| 1000.0 | n-Butyl acrylate |
| 10.0 | Acrylic acid |
| 14.3 | t-Butyl hydroperoxide (70% active) |

A reductant solution is made by dispersing 6.1 parts of sodium formaldehyde sulfoxylate in 69.9 parts of deionized water.

The polymerization flask is pre-charged with 729 parts of deionized water and 3.0 parts of a solution containing 1% of iron-ethylene diamine tetraacetic acid complex, and the procedure of Example 1 was repeated using 336.0 parts of vinylidene chloride. The latex so-produced had a non-volatile content of 53.73%, a particle size of 0.22 micron, a weight per gallon of 8.92 pounds, a pH of 2.3, and a vinylidene chloride content of 16.9%.

The water vapor transmission rate of a film of this latex, plasticized with 2% of 2,2,4-trimethylpentanediol-1,3-mono-isobutyrate on a total weight basis, was 11.4 gram.mil/m$^2$ day.mm Hg as compared with 63.4 gram.mil/m$^2$ day.mm Hg for a commercial latex containing only acrylic monomers.

EXAMPLE 3

The latex of Example 1 was neutralized to pH 6.7 with 28% ammonium hydroxide and used to make an exterior paint having the following composition.

| Parts (wet) | component |
|---|---|
| 1.0 | Attapulgite clay |
| 17.0 | Propylene glycol |
| 9.0 | Sodium salt of polyacrylic acid (Tamol 960 may be used) |
| 3.0 | Octyl phenol adducted with 10 molar proportions of ethylene oxide and etherified to provide the benzyl ether (Triton CF-10 supplied by Rohm & Haas may be used) |
| 3.0 | Tetra potassium pyrophosphate |
| 225.0 | Titanium dioxide, rutile |

| Parts (wet) | component |
| --- | --- |
| 85.0 | Mica |
| 100.0 | Amorphous silica |
| 4.0 | Hydroxyethyl cellulose |
| 300.0 | Latex of Example 1 - pH 6.7 |
| 8.0 | 2,2,4-Trimethylpentandiol-1,3 monoisobutyrate |
| 380 | Deionized water |

When the above components are milled together, a paint is provided which has application properties comparable to those of commercial paints based on all acrylic emulsion copolymers. However, and in comparison with an identically formulated paint made with a commercial all acrylic latex, the paint of this example had a higher gloss, a lower thickener requirement, and six times the scrub resistance as measured on a Gardner Straight Line Washability and Abrasion Machine.

EXAMPLE 4

The latex of Example 2 was used in the exterior paint formulation of Example 3 to produce a latex paint. The product of this example had the same good application and performance properties obtained in Example 4, but instead of six times the scrub resistance, it had four and one-half times the scrub resistance.

What is claimed is:

1. An aqueous latex comprising an aqueous emulsion copolymer of monomers consisting essentially of from 10% to 30% of vinylidene chloride together with a mixture of 20% to about 50% of styrene, and from 40% to 60% of monoethylenic ester, said mixture of monomers providing the copolymer with a glass transition temperature in the range of $-10°$ C. to $+10°$ C., and from about 0% to 10.0% of a monomer promoting adhesion, said proportions being based on the total weight of monomers copolymerized.

2. A latex as recited in claim 1 which said monomers are provided in aqueous emulsion having a pH in the range of 2.0–5.0.

3. A latex as recited in claim 1 in which said adhesion promoting monomer contains a ureido hydrogen atom and is used in an amount of from 0.5% to 5.0%.

4. A latex as recited in claim 3 in which said ureido-functional monomer is a monoethylenically unsaturated derivative of an ethylene urea.

5. A latex as recited in claim 1 in which said ester is an acrylic or methacrylic ester with an alkanol having from 2–8 carbon atoms used in a proportion which provides a glass transition temperature in the range of $-5°$ C. to $+5°$ C.

6. An aqueous latex as recited in claim 5 in which said ester is n-butyl acrylate.

7. An aqueous latex paint comprising the latex of claim 1.

8. An aqueous latex paint as recited in claim 7 in which said latex is neutralized to a pH of 6.5–8.0.

* * * * *